United States Patent [19]

Rando et al.

[11] Patent Number: 4,949,742
[45] Date of Patent: Aug. 21, 1990

[54] TEMPERATURE OPERATED GAS VALVE

[75] Inventors: Joseph F. Rando, Los Altos Hills; Ilya M. Fishman, Fremont, both of Calif.

[73] Assignee: Spectra-Physics, Inc., San Jose, Calif.

[21] Appl. No.: 344,325

[22] Filed: Apr. 26, 1989

[51] Int. Cl.⁵ .............................................. F16K 13/10
[52] U.S. Cl. ........................................ 137/13; 137/828
[58] Field of Search ........................ 137/13, 828, 251.1

[56] References Cited

U.S. PATENT DOCUMENTS 3,528,449 9/1970 Witte ................................ 137/251.1

*Primary Examiner*—Alan Cohan
*Attorney, Agent, or Firm*—Donald C. Feix; Paul Davis; Thomas M. Freiburger

[57] ABSTRACT

A gas valve which is particularly useful in a laser gas fill system requiring repeated fillings includes a conduit positioned between high and low pressure gas regions. Within the conduit is a restriction, and this restriction is closed by a meltable solid material. When the valve is to be opened, heat is applied to the meltable solid material, either internally or externally, causing at least some of the material to flow and allow the passage of gas from the higher pressure region to the lower pressure region. When the pressure between the two regions has substantially equalized, or at least the pressure differential has greatly diminished, surface tension associated with the restriction in the conduit pulls the liquified material back into place to close and reseal the valve, at which point heat application is dicontinued so that the material again becomes solid. The geometry of the restriction is such that all or substantially all of the liquid material will return essentially to its original position, allowing the valve to be used in repeated on/off cycles. Also, the valve geometry and heat application are such a high pressure differential will not cause the liquified material to blow away from the valve due to high velocities.

31 Claims, 3 Drawing Sheets

TEMPERATURE OPERATED GAS VALVE

BACKGROUND OF THE INVENTION

The invention is in the field of fluid valves, and more particularly it is concerned with a temperature operated gas valve wherein a plug of material is melted to open the valve. In a specific context, the invention is related to laser gas fill systems wherein supplementary gas must be admitted into a gas laser tube a number of times during the life of the laser.

Gas lasers such as argon lasers have a plasma tube which must be filled with argon gas prior to startup of the laser. As described in U.S. Pat. No. 4,683,575, assigned to the assignee of the present invention, the gas fill systems for these lasers have often included rubber seals or other rubber-like valve closure components which could not be baked at a high temperature. As a result, two separate baking operations were required to clean the different portions of the laser assembly, one at a high temperature and another at a lower temperature. It would be desirable to clean all components, including the gas fill system components, at the higher temperature.

The disclosure of U.S. Pat. No. 4,683,575 is hereby incorporated by reference into this application.

In the gas laser and in other environments, mechanical valves are sometimes impractical or inefficient or too costly. There has often been a need for an alternative to a mechanical valve for controlling the movement of gas from a higher pressure region to a lower pressure region, with the capability of remote electrical operation of the valve.

Valve constructions satisfying these needs are among the objects of the present invention described below.

SUMMARY OF THE INVENTION

A gas valve constructed in accordance with the present invention is non-mechanical, may be electrically operated and may be subjected to high temperature environments such as a high temperature bake in a laser cleaning operation. The valve comprises a conduit extending between a high pressure gas volume or region and a lower pressure gas region, with a restriction in the conduit. A meltable solid material normally closes the restriction in the conduit. When the valve is to be opened, heat is applied to the meltable solid material, either internally or externally, to melt at least a portion of the material to the point that the pressure differential of the gas volumes causes gas to flow from the higher pressure region to the lower pressure region. The heat is maintained until the pressure is substantially equalized between the two volumes, at which point surface tension of the restriction, particularly with the preferred geometry of the restriction, causes the liquified material to return to its original position by surface tension. The heat application is then discontinued, so that the material re-solidifies, sealing the valve.

For repeated operations wherein gas is to be admitted at repeated intervals from higher pressure storage volume to a lower pressure volume, or even vented to atmosphere, two valves may be used in series. The valve adjacent to the reservoir of higher pressure gas is opened first, admitting gas to a space in the conduit between the first and the second valves. Pressure is essentially equalized between this inter valve space and the high pressure storage reservoir.

Then, the first valve adjacent to the reservoir is closed by surface tension and by removal of heat, and the second valve is opened. Gas flows from the inter valve space into the volume or space where it is desired, until pressure substantially equalizes between this volume and the inter valve space. Similarly to the first valve, the second valve is closed by surface tension and by the removal of heat.

The two-valve embodiment is useful in any situation wherein the gas source volume and the region of its ultimate destination are not to be equalized.

In one preferred embodiment of the invention, the conduit is of silver, with a conical silver insert member within the conduit, providing a restriction which substantially closes the conduit but allows the slow passage of gas from the higher pressure region to the lower pressure region. The conical insert piece is also of silver, and the meltable solid material in this embodiment is silver chloride, which is wetted easily onto silver. The silver conduit and conical insert do not oxidize under high temperature, as would a number of other metals, even stainless steel. The silver chloride has a melting point of about 455° C.

The conical insert piece is retained in position in the tube by crimping of the tube at several points, with the apex end of the conical insert pointing in the direction of lower pressure. The cone shape forms a wedge-shaped annular region between the surface of the cone and the interior surface of the conduit, providing ideal conditions for high surface tension of liquid materials.

In other embodiments, the restriction in the conduit can comprise a narrow, generally cylindrical neck in the conduit or a flattened portion of the conduit. It is important that the geometry of the restriction promotes surface tension for drawing the liquid back to the restriction and also that it be designed to avoid a blowing out of the liquified material from sudden, high velocity flow of the material as it liquifies, due to a high pressure differential between the two sides of the valve. The conical insert configuration is advantageous in this sense, in that it tends to open first in one spot, allowing a very slow bubbling flow of gas, and gradually opens in further locations. Rapid movement of liquified material is avoided.

Heat may be applied to melt the meltable solid material by any of several methods. An electrical resistance wire may be positioned inside the conduit, directly through the restriction and in contact with the meltable material, or inside the conical insert piece, if that configuration is used. Alternatively, heat may be applied from outside the tube, as by an electrical resistance wire wound around the tube in the vicinity of the restriction, or by applying current to the tube itself, if the tube is of conductive metal.

In the case of a gas fill system of a gas laser, with which the invention is concerned in one preferred embodiment, a pair of temperature operated gas valves of the invention are placed in tandem in a conduit or tube, as discussed above. Before completion of the gas laser assembly, the plasma tube as well as the fill system are evacuated, and the system is subjected to a high temperature bake for cleaning of the entire system. The baking may be of such high temperature as to exceed the melting point of the meltable material in the valves, if desired. This will not adversely affect the valves, since the entire system is evacuated and no gas will flow across either valve. and in any event the melted material remains in place by surface tension. Upon cooling, the valves will solidify. Later, after the plasma tube has been charged with gas, a gas fill reservoir is filled with gas, on a high pressure side of the two valves. Downstream of the second valve is the plasma tube.

The double-valve system in accordance with the invention can be designed to deliver over 500 charges of gas from the reservoir into the plasma tube as the laser "uses up" its plasma gas and requires supplementary charges of gas. Each time a charge of gas is to be delivered to the tube, the first, upstream valve is opened initially to allow gas to flow into the inter valve space, which comprises a specified small volume, until pressure equalizes on either side of this first valve. Then this valve is closed and the second valve is opened, releasing the measured charge of gas into the plasma tube and equalizing pressure between the inter valve volume and the plasma tube, after which the second valve is then closed.

It is therefore among the principal objects of the invention to provide an improved, non-mechanical gas valve operable by temperature and reliable for opening and closing repeatedly hundreds of times. A related object is to use such a valve in a gas fill system of a gas laser, enabling the entire valve assembly to be baked at high temperatures without adverse effects.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENTS

Figure 1:
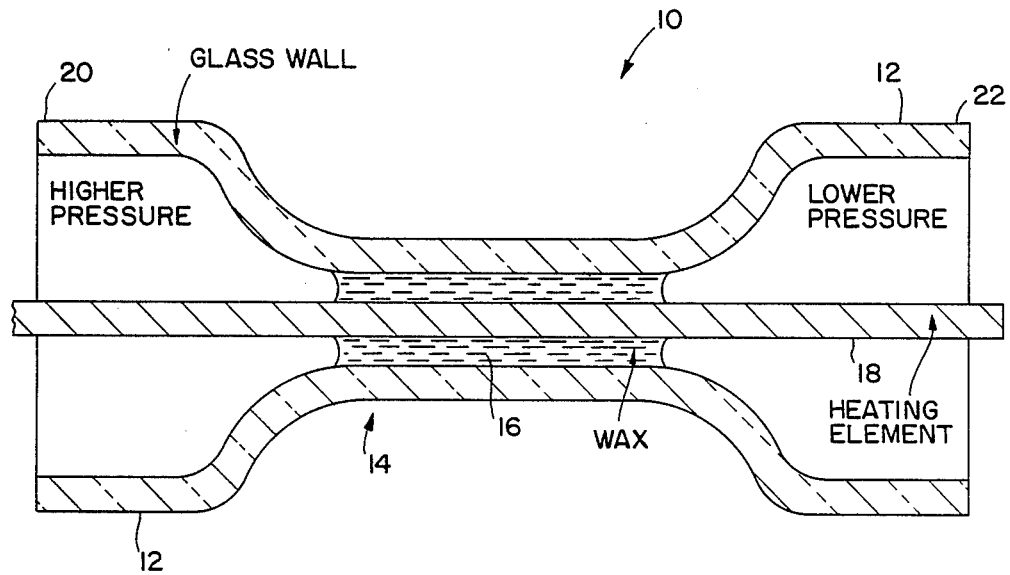
FIG. 1 is a schematic elevation view in section, showing one embodiment of a temperature operated gas valve in accordance with the principles of the present invention.

In the drawings, FIG. 1 shows one embodiment of a temperature operated gas valve in accordance with the invention, generally identified by the reference number 10. In this embodiment, a tube or conduit 12 has a narrowed neck portion 14 within which is positioned a meltable solid material 16. An electrical resistance wire or heating element 18 may pass directly through the solid material 16 as illustrated, or heat may alternatively be applied from outside the neck portion 14.

The meltable solid material 16 may be of relatively low melting point, such as wax. The particular application may determine the material selected. The conduit or tube 12 may be glass or any other rigid conduit material, but one which is readily wetted by the meltable material 16 when in liquified state.

The narrowed neck portion 14 has a high surface tension for the material 16 when in liquid state, under principles of surface tension and capillarity whereby the liquid tends to prefer and adhere to the narrow constriction.

An upstream end 20 of the conduit 12 leads to a higher pressure gas region, while a downstream end 22 leads to a lower pressure region or volume, as indicated on the drawing. When heat is applied through the heating element 18 (or externally as discussed above), the wax or other solid material 16 is elevated in temperature, first in the areas in contact with and immediately adjacent to the heating element 18. This causes some of the material 16 to melt in the vicinity of the heating element, and the higher pressure on one side of the material 16 cause liquid to flow to the right as seen in FIG. 1. This continues until pressure on the two sides of the valve 10, i.e. the solid material 16, are approximately equalized, or at least until the pressure differential is so low that surface tension can overcome the pressure differential and cause the liquified material to again return to the configuration shown in FIG. 1.

By the configuration shown, the permanent loss of liquified material 16 to the lower pressure side of the valve is substantially prevented. The melting occurs at least initially in the narrow region immediately adjacent to the heating element 18, and gas starts to flow as soon as a very thin layer of material adjacent to the heating element 18 has been liquified. This presents only a very small annular gap for gas flow, so that the gas cannot attain a high velocity in flowing from the higher pressure region to the lower pressure region. Thus, without high velocity, there is no tendency to blow the liquified material away from the valve. Once pressure has substantially equalized on the two sides of the valve, surface tension again draws all of the material into essentially its original position, and then the heat can be removed to re-solidify the material and reestablish the integrity of the valve in the sealed position.

Figure 2:
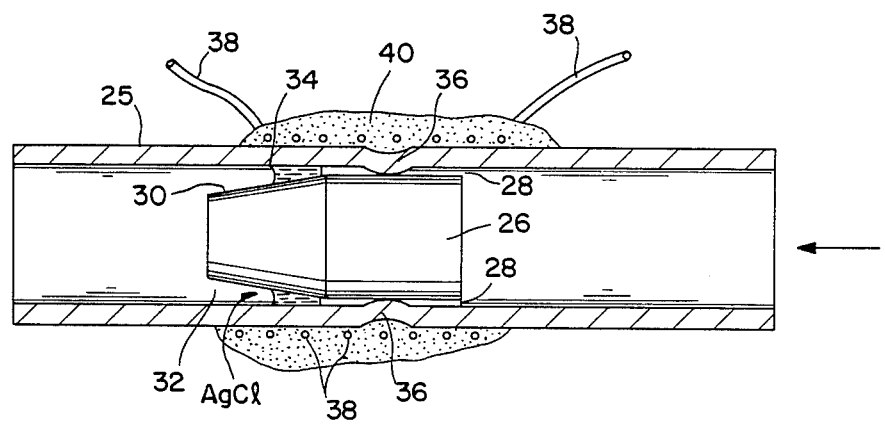
FIG. 2 is another schematic view in sectional elevation, showing another embodiment of a temperature operating gas valve of the invention.

FIG. 2 shows a preferred embodiment of the invention wherein the constriction in a tube or conduit 25 is formed in a different way. In this embodiment, an uninterrupted cylindrical tube 25 is used, but with an insert member 26 positioned in the conduit and substantially plugging the conduit except for a narrow annuals 28 through which gas can flow. At the downstream end of the insert 26 is a conical portion 30, which establishes an annulus wedge of space 32 which provides excellent surface tension between a liquid valve seal and the surfaces of the conduit wall and the insert member 26.

A meltable solid material 34 is shown in the wedge-shaped base 32, sealing the valve closed. The insert member 26 may be retained in the interior of the conduit 25 by crimping of the tube 25 at several points as illustrated, for example, at 36 in the drawing. This is particularly suitable if the tube 25 is of metal, but other operations may be used to retain the insert 26 in place if desired. In FIG. 2, the heat application to the meltable material 34 is by an external heating element 38, wrapped around the exterior of the conduit 25 as illustrated. The coils of resistance wire 38 may be covered by an insulating material 40, for more efficient and localized application of heat to the vicinity of the meltable sealing material 34.

However, it should be understood that an internal resistance heater can be used in the embodiment of FIG. 2, in a similar manner similarly to that shown in FIG. 1.

In one preferred embodiment of the invention, the conduit 25 is of silver, as is the insert member 26, with the meltable sealing material 34 being silver chloride. The silver surfaces are readily wetted by the liquified silver chloride, optimizing surface tension in the wedge shaped annular space 32.

The narrow end of the conical portion 32 is oriented in the downstream direction, i.e. toward the low-pressure region, and when heat is applied via the heater wire 38, the silver chloride 34 begins to melt and higher upstream pressure moves some of the liquified material to create very small gas flow passages through the material. The gas tends to bubble through the liquified material relatively slowly, even if the pressure on the upstream side is considerably higher than the on downstream side.

Figure 3:
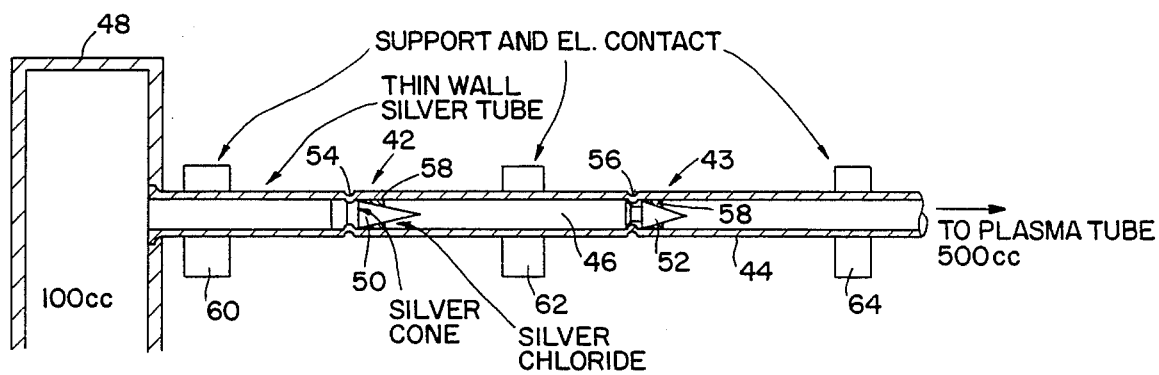
FIG. 3 is a schematic elevation view in section, showing a portion of a gas fill system wherein two valves in accordance with the invention are placed in tandem in a conduit, for controlling the flow of charges of gas flowing from a high pressure gas reservoir.

FIG. 3 shows an embodiment of the invention wherein two valves 42 and 43 of the invention are used in tandem in a conduit or tube 44. This may be in the context of a gas fill system for a plasma tube of a gas laser, but the two-valve tandem system is also important and useful in other situations wherein gas is at a higher pressure on the upstream side of the two valves than on the downstream side of the two valves, but pressure will not ultimately be equalized between the pressurized gas volume and the ultimate destination of the released gas. Thus, a quantity of the pressurized gas can first be released through the first valve 42 by opening the valve 42 while keeping the valve 43 closed. Pressure equalizes between the pressure source and the inter valve space 46. Then, the first valve 42 is closed and the second valve 43 is opened, until pressure equalizes between the inter space valve 46 and the ultimate destination of the gas. In this way, a measured amount of gas can be released, in two successive steps. This can be repeated as many times as desired, to deliver an appropriate volume of gas out of the pressurized source and to the ultimate destination.

In FIG. 3 a gas source or pressurized gas reservoir 48 is shown at the left side of the figure, representing the higher pressure source of gas. The arrangement shown in FIG. 3 can be applied to the gas fill system for a gas laser. The tube or conduit 44 can be of silver or other appropriate material, and the two conical insert members 50 and 52 of the valves 42 and 43 can be of similar material. As illustrated, the tube, particularly if of metal, is crimped or otherwise deformed at locations 54 and 56 to hold the insert members 50 and 52 in position within the conduit. If the tube and inserts are of silver, meltable solid material 58 of the valves may be silver chloride, as above. This can be a particularly appropriate material for the gas fill system of a laser tube, since silver chloride melts at 455° C. In any event, the particular materials, including the meltable solid material, can be selected in accordance with the environmental temperatures to be encountered.

However, even if environmental temperatures, such as a baking temperature in the context of a laser gas fill system, greatly exceed the melting point of the solid material 58, this will not adversely affect the valves 42 and 43, since the material 58 will remain in place due to surface tension. Only if gas is to be held back, within the pressurized reservoir source 48 during baking, is it necessary to use a solid material 58 which has a higher melting point than the bake temperature.

In FIG. 3 the conduit or tube 44 is assumed to be of electrically conductive metal, preferably silver, and heat is applied in this exemplary embodiment by electrical resistance heating of the tube itself. Thus, electrical contacts 60, 62 and 64 are shown in electrical contact with the exterior of the silver tube 44. When the first valve 42 is to be opened, current is passed between the electrical contacts 60 and 62, causing the silver tube in this region to heat up to a temperature above the melting point of the solid material 58. Once the pressures have equalized on either side of the valve 42, and surface tension has brought the liquified material back to its valve closure location, electrical current is discontinued in this region of the tube and is then applied between the electrical contacts 62 and 64. This repeats the valve opening process for the valve 43.

The heat generated in the silver tube in the configuration of FIG. 3 propagates into the thin layer of silver chloride which is in immediate contact with the wall. The dynamic effects of the gas pressure on the liquified thin layer of silver chloride are minimized by the thickness of the liquid layer and by the shape of the cone, which promotes surface tension. The gas movement might be expected to distribute the silver chloride, particularly if the source pressure in the reservoir 48 is relatively high, but since the thermally-generated liquid channel is very thin initially, the speed of the gas is limited. In addition, because the cross-sectional area of the silver chloride is increasing in the direction of gas motion, the mass of the accelerated fluid is small compared to the mass of the total fluid silver chloride. The result is a moderated bubbling of the gas through the wedge-shaped annulus with complete containment of the silver chloride.

In a test of a two-valve embodiment of the invention as represented in FIG. 3, a silver tube was used having dimensions of 0.062 inch diameter thickness by 0.003 inch wall thickness by 1 inch length. The heating was accomplished with 125 amps of AC current for 3 to 5 seconds. The resistance of the silver tube was about 1.14 milliohms, resulting in about 50 watts of power.

To assure that liquid silver chloride is not blown out of the valves 42 on opening of each valve, a restriction can be put in the tube 44 just downstream of each valve 42.

Figure 4:
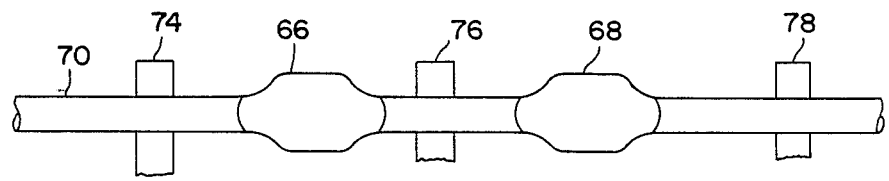
FIGS. 4 and 5 are plan and elevation views showing another embodiment of the invention, wherein a conduit has flattened sections to form two valves which operate in accordance with the invention.
Figure 5:
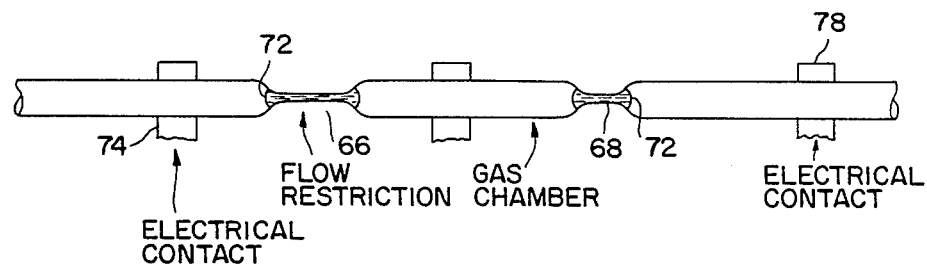

FIGS. 4 and 5 show another embodiment of the present invention, wherein two valves 66 and 68 are again provided in tandem arrangement in a tube or conduit 70. It should be understood that FIGS. 4 and 5 show another form of a surface tension solid liquid valve, and the valve can be either singular or with multiple valves in tandem as shown.

In this embodiment of the invention, the valves 66 and 68 are formed by flattening the tube 70 at the location of the valve to provide a restriction in the conduit with high surface tension The conduit 70 can be formed of silver, as above, or of glass or any other alloy or suitable material. The conduit is flattened to the extent that a very narrow restriction is created, as schematically illustrated in the drawings, but not so as to totally seal off the conduit. Meltable solid material 72, such as silver chloride as in the above embodiments (particularly if the conduit 70 is of silver) is located in the conduit restrictions to form the valves 66 and 68.

Although in this embodiment, as above, heating of the two valves can be by any suitable interior or exterior means, such as those described above electrical conduits 74, 76 and 78 are again shown for creating the electrical resistance heating which can be used to elevate the temperature of each restriction, individually, above the melting pointing point of the meltable solid material 72. As discussed above, the conduit is advantageously formed of silver for such direct resistance heating through the electrical conduits 74-76 or 76-78. At the same time, the silver metal is readily malleable, so that the flattened areas are easily formed.

Figure 6:
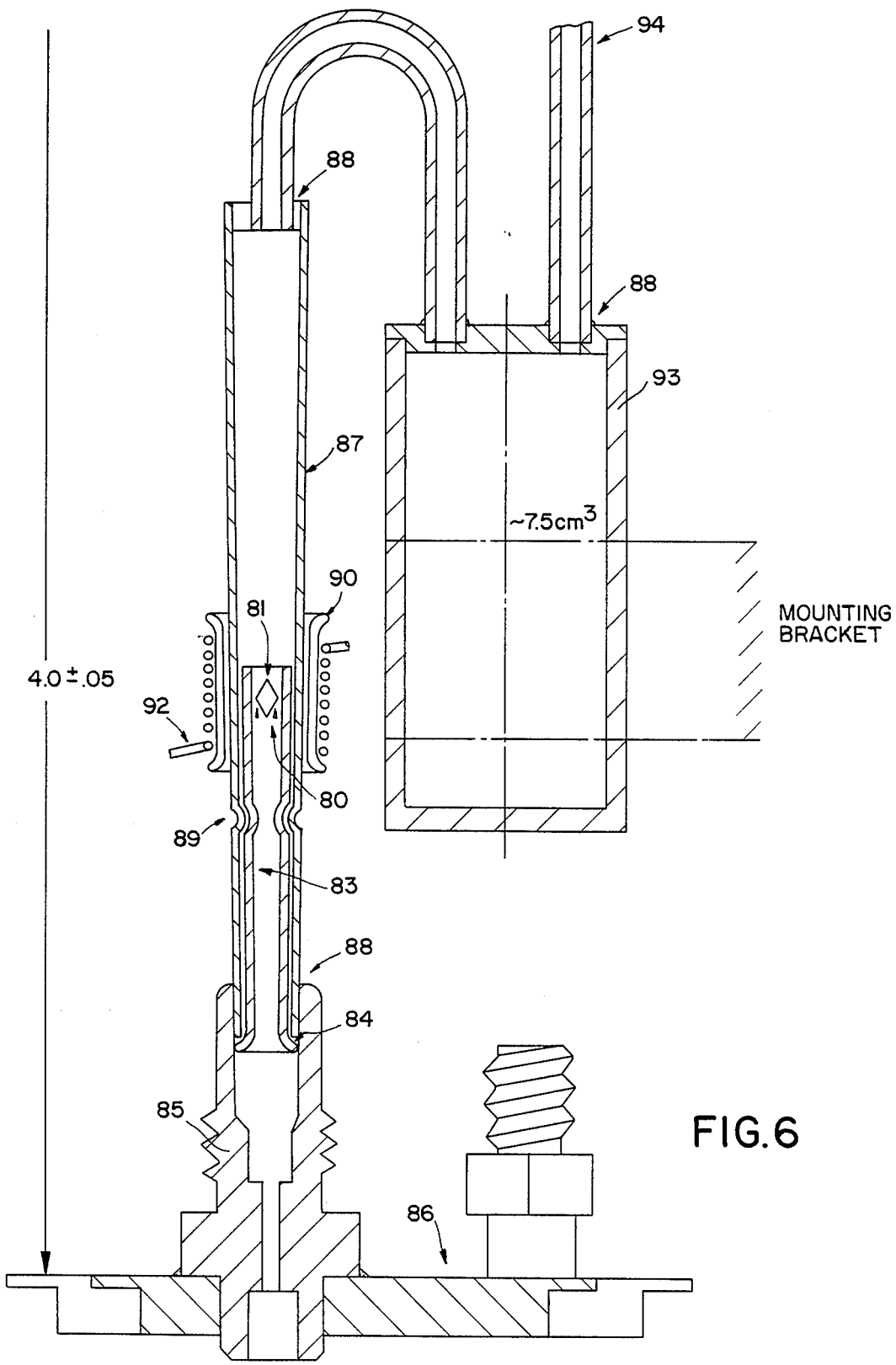
FIG. 6 is a schematic sectional view showing an embodiment of the invention as applied to a gas fill system of a laser.

FIG. 6 shows another preferred embodiment of a temperature operated gas valve apparatus, secured to and forming a part of a gas fill system for a laser. The valve assembly is mounted directly to the flange of a laser 86 such as an argon laser, via a fitting 85. A mass of silver chloride 80 seals the space between a silver cone 81 and a silver tube 83. The silver tube 83 is brazed into another tube 87, preferably a stainless steel tube, by brazing as indicated at 84. The brazed joint 84 is a final braze done at a lower temperature which is compatible with the silver end of the stainless steel.

Other brazing is performed at several locations 88 in the system, at higher temperatures.

A restriction 89 can be formed in both tubes as a final step, after the components have all been brazed together. The purpose of the restriction 82 is to slow the velocity of gas flow through the temperature operated valve so that the liquified silver chloride 80 is not blown away from the valve by gas flow. Pressure is kept higher just upstream of the restriction 82, during gas flow, than the pressure existing downstream of the restriction.

The silver chloride 80 is heated in this preferred embodiment by a resistance heater 92 shown schematically around the exterior of the outer tube 87. A woven insulating sleeve 90 preferably is positioned between the resistance heater 92 and the tube 87.

A gas reservoir shown at 93 contains the fill gas, under much higher pressure than the pressure within the laser tube. Gas is initially admitted to the reservoir 93, after baking/cleaning of the system, through a fill tube 94, which may then be pinched off and sealed.

Valves constructed in accordance with the principles of the present invention have particular utility in a gas fill system for the plasma tube of a gas laser, as described above. These valves enable repeated openings and closings of the valves and sequential fillings of the plasma tube with charges of gas, while also permitting a high temperature bake of the entire gas fill system prior to initial startup of the laser. However, the valves of the invention have advantageous uses in many other applications, either as a single valve or two valves in tandem. Application of heat can be by electrical resistance, which is simple and convenient and allows remote operation or it can be by any other type of heating, including solar or environmental heating for particular uses of the valves wherein they are to be opened under certain conditions of environmental temperature. The materials of the conduit and for the meltable solid material can be selected for maximizing surface tension and also for the particular melting point desired in the particular application.

While we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. A method for operating a valve between two gas volumes, a first volume at an initially higher pressure and a second volume at an initially lower pressure, comprising, providing a conduit between the first volume and the second volume, the conduit including a horizontal portion, providing a restriction in the horizontal portion of the conduit for which a liquid would have a preference due to surface tension at the restriction, with a meltable solid material closing the restriction, when gas is to be moved from the first volume to the second volume, heating the meltable solid material until at least part of the material becomes liquified, allowing gas to pass from the first volume to the second volume, until the pressure differential between the two volumes becomes small, at which time the melted material returns essentially to its preferred initial position by surface tension, when valve closure is required, discontinuing heating and allowing the melted material to re-solidify essentially in its initial position thereby to seal the restriction and close the valve.

2. A method for operating a valve between two gas volumes, a first volume at an initially higher pressure and a second volume at an initially lower pressure, comprising, providing a conduit between the first volume and the second volume, providing a restriction in the conduit for which a liquid would have a preference due to surface tension at the restriction, with a meltable solid material closing the restriction, when gas is to be moved from the first volume to the second volume, heating the meltable solid material until at least part of the material becomes liquified, allowing gas to pass from the first volume to the second volume, until the pressure differential between the two volumes becomes small, at which time the melted material returns essentially to its preferred initial position by surface tension, when valve closure is required, discontinuing heating and allowing the melted material to re-solidify essentially in its initial position thereby to seal the restriction and close the valve, and including providing two said restrictions in the conduit, a first restriction and a second restriction, with meltable solid material closing both restrictions, forming two valves in tandem, said second volume comprising an inter valve volume and there being a lower pressure region downstream of the second restriction, and including trapping gas in the inter valve volume with closure of the first restriction and valve then opening the second restriction and valve by heating the meltable solid material and allowing gas to move from the inter valve volume to said lower pressure region downstream, thereby delivering to the lower pressure region a volume of gas determined by the inter valve volume and not requiring equalization of pressures between the first volume and the lower pressure region.

3. The method of claim 2, wherein the first volume comprises a pressurized gas fill reservoir in a gas fill system of a laser, and wherein the lower pressure region downstream comprises a plasma tube of the laser.

4. The method of claim 3, wherein the conduit extends between the two restrictions and the conduit comprises a silver tube with silver chloride as the meltable solid material in the restrictions.

5. The method of claim 4, wherein the restrictions in the tube each comprise an insert member tightly fitted and retained in position in the conduit, establishing narrow passageways between the conduit and the insert members in which the meltable solid material, when liquified, is retained by surface tension.

6. The method of claim 5, wherein each insert member is formed of silver.

7. The method of claim 5, wherein each insert member has a conical portion oriented in the tube such that its largest diameter is slightly smaller than the inside of the conduit, with the conical portion tapering smaller in the direction of gas flow.

8. The method of claim 4, wherein the restrictions each comprise a flattened region of conduit, nearly closed but with a narrow passageway for flow of gas.

9. The method of claim 1, wherein the restriction comprises a flattened region of conduit, nearly closed but with a narrow passageway for flow of gas.

10. The method of claim 1, wherein the restriction in the conduit comprises a narrowing of the conduit to a smaller diameter.

11. A temperature operated gas valve operable between two gas volumes, a first volume at an initially higher pressure and a second volume at an initially lower pressure, comprising,
a conduit between the first volume and the second volume, the conduit including a horizontal portion,
a restriction in the horizontal portion of the conduit forming a narrow passageway for which a liquid would have a preference due to surface tension at the restriction, and
a meltable solid material within and enclosing the restriction,
whereby, when gas is to be moved from the first volume to the second volume, the meltable solid material may be heated until at least part of the material becomes liquified, allowing gas to pass from the first volume to the second volume, until the pressure differential between the two volumes becomes small, at which time the melted material will return essentially to its preferred initial position by surface tension, at which point heating may be discontinued to re-solidify the melted material to seal the valve closed.

12. A temperature operated gas valve operable between two gas volumes, a first volume at an initially higher pressure and a second volume at an initially lower pressure, comprising,
a conduit between the first volume and the second volume,
a restriction in the conduit forming a narrow passageway for which a liquid would have a preference due to surface tension at the restriction, and
a meltable solid material within and enclosing the restriction,
whereby, when gas is to be moved from the first volume to the second volume, the meltable solid material may be heated until at least part of the material becomes liquified, allowing gas to pass from the first volume to the second volume, until the pressure differential between the two volumes becomes small, at which time the melted material will return essentially to its preferred initial position by surface tension, at which point heating may be discontinued to re-solidify the melted material to seal the valve closed, and
including two said restrictions in the conduit, a first restriction and a second restriction, with multiple solid material closing both restrictions, forming two valves in tandem, said second volume comprising an inter valve volume and there being a lower pressure region downstream of the second restriction, whereby the first restriction may initially be opened by heating, so that gas flows into the inter valve volume and is trapped between the two valves when the first valve is closed, then the second restriction may be opened by heating and melting the meltable solid material therein, thereby allowing gas to move from the inter valve volume to said lower pressure region downstream.

13. A valve according to claim 12, wherein the first volume comprises a pressurized gas fill reservoir in a gas fill system of a laser, and wherein the lower pressure region downstream comprises a plasma tube of the laser.

14. A valve according to claim 13, wherein the conduit comprises a generally cylindrical tube extending uninterrupted between the two restrictions.

15. A valve according to claim 14, wherein the conduit comprises a silver tube, with silver chloride as the meltable solid material in the restriction.

16. A valve according to claim 15, wherein the restrictions in the conduit each comprise an insert member tightly fitted and retained in position in the conduit, establishing narrow passageways between the conduit and the insert members in which the meltable solid material, when liquified, is retained by surface tension.

17. A valve according to claim 16, wherein each insert member is formed of silver.

18. A valve according to claim 16, wherein the restriction in the conduit comprises an insert member tightly fitted and retained in position in the conduit, establishing narrow passageways between the conduit and the insert members in which the meltable solid material, when liquified, is retained by surface tension.

19. A valve according to claim 18 wherein the insert member has a conical portion oriented in the conduit such that its largest diameter is slightly smaller than the inside of the conduit, with the conical portion tapering smaller in the direction of gas flow, whereby surface tension is high between the conical portion and the inside surface of the conduit.

20. A valve according to claim 19, wherein the conduit comprises a silver tube and the insert member is of silver, with silver chloride as the meltable solid material in the restriction.

21. A valve according to claim 11, wherein the restriction comprises a flattened region of conduit, nearly closed but with a narrow passageway for flow of gas.

22. A valve according to claim 11, wherein the restriction in the conduit comprises a narrowing of the conduit to a smaller diameter.

23. A valve according to claim 11, further including heating means adjacent to the meltable solid material, for elevating the temperature of the meltable solid material beyond its melting point when the valve is to be opened.

24. A valve according to claim 23, wherein the heating means comprises an electrical resistance heater.

25. A temperature operated gas valve operable between two gas volumes, a first volume at an initially higher pressure and a second volume at an initially lower pressure, comprising,
- a conduit between the first volume and the second volume,
- a restriction in the conduit forming a narrow passageway for which a liquid would have a preference due to surface tension at the restriction, and
- a meltable solid material within and enclosing the restriction, with a heating means adjacent to the meltable solid material, for elevating the temperature of the meltable solid material beyond its melting point when the valve is to be opened, the heating means comprising an electrical resistance wire passing directly through the restriction,
- whereby, when gas is to be moved from the first volume to the second volume, the meltable solid material may be heated using the electrical resistance wire until at least part of the material becomes liquified, allowing gas to pass from the first volume to the second volume, until the pressure differential between the two volumes becomes small, at which time the melted material will return essentially to its preferred initial position by surface tension, at which point heating may be discontinued to re-solidify the melted material to seal the valve closed.

26. A valve according to claim 23, wherein the heating means comprises an electrical resistance heater wrapped around the outside of the conduit at the restriction.

27. A valve according to claim 23, wherein the heating means comprises an external means for applying heat to the outside of the conduit at the restriction.

28. A valve according to claim 11, further including a flow-retarding restriction in the conduit downstream of said meltable solid material, for preventing a rapid flow of gas through the valve and thus preventing flowing of the melted solid material away from the valve.

29. A method for operating a valve between two gas volumes, a first volume at an initially higher pressure and a second volume at an initially lower pressure, comprising,
- providing a conduit between the first volume and the second volume,
- providing a restriction in the conduit for which a liquid would have a preference due to surface tension at the restriction, with a meltable solid material closing the restriction, the conduit being essentially symmetrical on either side of the restriction,
- when gas is to be moved from the first volume to the second volume, heating the meltable solid material until at least part of the material becomes liquified, allowing gas to pass from the first volume to the second volume, until the pressure differential between the two volumes becomes small,
- when the pressure differential between the two volumes is small, returning the melted material essentially to its preferred initial position solely by surface tension, and
- when valve closure is required, discontinuing heating and allowing the melted material to re-solidify essentially in its initial position thereby to seal the restriction and close the valve.

30. The method of claim 29, wherein the restriction in the conduit comprises an insert member tightly fitted and retained in position in the conduit, establishing a narrow passageway between the conduit and the insert member in which the meltable solid material, when liquified, is retained by surface tension.

31. The method of claim 30, wherein the insert member has a conical portion oriented in the conduit such that its largest diameter is slightly smaller than the inside of the conduit, with the conical portion tapering smaller in the direction of gas flow.

* * * * *